UNITED STATES PATENT OFFICE.

JAMES M. JENNINGS, OF ELIZABETH, NEW JERSEY, ASSIGNOR TO STANDARD OIL COMPANY, OF BAYONNE, NEW JERSEY, A CORPORATION OF NEW JERSEY.

FOAM COVERING FOR PREVENTING THE EVAPORATION OF STORED LIQUIDS.

1,423,720.

Specification of Letters Patent. Patented July 25, 1922.

No Drawing. Application filed May 24, 1921. Serial No. 472,297.

*To all whom it may concern:*

Be it known that I, JAMES M. JENNINGS, a citizen of the United States, residing at 907 Colonial Road, Elizabeth, in the county of Union and State of New Jersey, have invented a new and useful Improvement in Foam Coverings for Preventing the Evaporation of Stored Liquids, of which the following is a specification.

The present invention relates to foams and more particularly to substantially stable or permanent fluent foams suitable for use as coverings for volatile liquids and for liquids containing volatile constituents, for example gasoline, crude petroleum and the like, for the prevention of evaporation thereof. The invention will be fully understood from the following description thereof in which specific examples embodying the invention are set forth.

In accordance with the present invention a foam is prepared by whipping or beating a liquid containing a body-forming material, such as glue, dextrin or commercial glucose, glycerine and a relatively small proportion of water (less than 15%), together with glycerine and a peptizing agent, such as calcium chloride. The formation of the foam may be facilitated by the addition of a foaming agent, such as saponin, soap bark extract, soaps derived from the treatment of mineral oil with fuming sulfuric acid, and the like.

The proportion of water in the foam liquid may be from 5 to 15%, and that of the body-forming material may be from 5% upwards. With less readily gelling body-forming materials, such as dextrin, a higher proportion may be employed than with those which gel more readily, such as glue or gelatine. Thus with glue, from 5 to 10% may be employed, and with dextrin, from 5 to 20% may be employed. The proportion of glycerine may be from 50% up. The glycerine may be replaced in part, for example, by the simple sugars. Thus, if the body-forming material of the foam liquid is provided by the dextrin of commercial glucose, the sugars present therein permit the corresponding reduction of the proportion of glucose. The foaming agent may be from 0.025 to 0.5% of the total. From 10 to 25% of calicum chloride may be added to effect the permanent peptization of the liquid. In case gelatine or glue is employed as the body forming material, a setting salt of the character described in my prior application, Serial No. 425,848, filed November 22, 1920, such as ferrous sulfate may be employed in the proportion of 0.25 to 2%, to increase the stability of the foam. In general it is preferred to use less than 1% of the setting salt.

The following specific examples illustrate foaming liquids embodying the present invention:

Example 1: Glue, 6%; water, 14.70%; ferrous sulfate, 1.20%; glycerine, 57.40%; calcium chloride, 20.60%; sulfonic soap, 0.03%.

Example 2: Glue, 6.5%; water, 7.00%; ferrous sulfate, 1.0%; glycerine, 65.00%; calcium chloride, 20.00%; sulfonic soap, 0.50%.

Example 3: Glue, 5.55%; water, 7.64%; glycerine, 66.00%; ferrous sulfate, .43%; calcium chloride, 20.00%; sulfonic soap, .38%.

Example 4: Glucose, 30%; glycerine, 40%; water, 4.6%; calcium chloride, 25%; sulfonic soap, 0.4%.

Example 5: Glucose, 28%; water, 6%; glycerine, 40%; calcium chloride, 25%; sulfonic soap, 1%.

The glycerine employed in these solutions may suitably be the commercial grade known as soap lye glycerine. In preparing the solutions the calcium chloride is preferably dissolved in glycerine, this solution being mixed with the solution of glue and ferrous sulfate in the water, to which the sulfonic soap has previously been added. The glucose is the commercial product, containing 15 to 20% of water and the sugars of which permit a reduction in the proportion of glycerine employed.

These foam liquids do not set or gel and consequently the foam produced therefrom has as its continuous phase a true liquid. Hence if the foam prepared from these liquids is removed for any reason from the surface of the stored liquid, it may be reused for production of a foam covering. The foams produced from these liquids are substantially permanent, and in certain cases have been known to remain substantially unimpaired after two months' time during which they were subjected to greatly varying atmospheric and temperature conditions. With proportions of glue and water within the limits above set forth, there is a very minute, if any contraction of the foam by reason of evaporation of water and does not tend to pull away from the wall of the liquid containing tank upon substantial changes in temperature. By reason of the liquid character of the continuous phase of the foam, it readily adapts itself to irregularities or obstructions in the storage tank containing the liquid to which it is applied and retains its continuous character even on rise and fall of the liquid in the storage tank.

While the present invention has been described in connection with specific examples illustrating it, it is not intended that the details shall be regarded as limitations upon the scope of the invention, except in so far as included in the accompanying claims. It is furthermore to be understood that where the use of glycerine is recited broadly in the claims, it may be replaced, at least in part, by the equivalent materials, such as the sugars of commercial dextrose.

I claim:

1. A liquid for producing fluent foams comprising from 5 to 15% of water, at least 5% of body-forming material and at least 50% of glycerine.

2. A liquid for producing foams comprising from 5 to 15% of water, at least 5% of body-forming material, at least 50% of glycerine and a small proportion of a setting agent.

3. A liquid for producing foams comprising 6 to 15% of water, 5 to 10% of glue, more than 50% of glycerine and a setting agent.

4. A foam liquid comprising 6 to 15% of water, 5 to 10% of glue, ¼ of 1% to 2% of setting salt and more than 50% of glycerine.

5. A liquid for producing foams comprising from 6 to 15% of water, from 5 to 10% of glue, more than 50% of glycerine, a small proportion of a foaming agent and a setting agent.

6. A liquid for producing foams comprising from 6 to 15% of water, from 5 to 10% of glue, more than 50% of glycerine, from 15 to 25% of calcium chloride, less than 1% of a setting salt, and a small proportion of a foaming agent.

7. A liquid for producing foams comprising from 6 to 15% of water, from 5 to 10% of glue, more than 50% of glycerine, from 15 to 25% of calcium chloride, less than 1% of a setting salt, a peptizing agent and a small proportion of a foaming agent.

8. A liquid for producing foams comprising 7.00% of water, 6.50% of glue, 65.00% of glycerine, 20.00% of calcium chloride, 1.0% of ferrous sulfate and 0.5% of mineral oil sulfonic soaps.

9. A substantially permanent fluent foam having as its continuous phase a liquid comprising less than 15% of water, glycerine and a body-forming material.

10. A relatively permanent fluent foam having as its continuous phase a liquid comprising from 6 to 15% of water, from 5 to 10% of glue, less than 1% of the setting salt and more than 50% of glycerine.

11. A relatively permanent fluent foam having as its continuous phase a liquid comprising 6 to 15% of water, 5 to 10% glue, more than 50% glycerine, 15 to 25% of calcium chloride, less than 1% of ferrous sulfate and a small proportion of a foaming agent.

12. A relatively permanent fluent foam having as its continuous phase a liquid comprising 7.00% of water, 6.5% of glue, 65.00% glycerine, 20.00% of calcium chloride, 1.00% ferrous sulfate and 0.5% mineral oil sulfonic soaps.

JAMES M. JENNINGS.